(12) United States Patent
Talla (10) Patent No.: US 7,787,021 B2
(45) Date of Patent: Aug. 31, 2010

(54) PROGRAMMABLE ARCHITECTURE FOR FLEXIBLE CAMERA IMAGE PIPE PROCESSING

(75) Inventor: Deependra Talla, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 433 days.

(21) Appl. No.: 11/928,330

(22) Filed: Oct. 30, 2007

(65) Prior Publication Data

US 2008/0101727 A1 May 1, 2008

Related U.S. Application Data

(60) Provisional application No. 60/863,472, filed on Oct. 30, 2006.

(51) Int. Cl.
*H04N 5/235* (2006.01)
(52) U.S. Cl. .................................................. 348/222.1
(58) Field of Classification Search ............. 348/222.1, 348/223.1, 229.1, 241, 246, 247, 252, 254; 712/200
See application file for complete search history.

(56) References Cited

U.S. PATENT DOCUMENTS

| 6,597,394 | B1 * | 7/2003 | Duncan et al. ............ 348/222.1 |
| 6,850,274 | B1 * | 2/2005 | Silverbrook et al. ........ 348/239 |
| 6,879,341 | B1 * | 4/2005 | Silverbrook ............. 348/231.6 |
| 7,511,748 | B2 * | 3/2009 | Kagle et al. ................. 348/246 |
| 7,532,244 | B2 * | 5/2009 | Ishikawa et al. ............ 348/308 |
| 2001/0045988 | A1 * | 11/2001 | Yamauchi et al. ........... 348/273 |
| 2009/0006773 | A1 * | 1/2009 | Yamaguchi et al. ......... 711/154 |

* cited by examiner

*Primary Examiner*—Lin Ye
*Assistant Examiner*—Trung Diep
(74) *Attorney, Agent, or Firm*—Robert D. Marshall, Jr.; W. James Brady; Frederick J. Telecky, Jr.

(57) ABSTRACT

This invention is a programmable image pipe processing architecture that offers full software flexibility to implement latest and greatest algorithms at fully hardwired performance levels. This invention achieves hardwired image pipe processing performance but offers full flexibility and programmability of software achieving the best of both hardwired and software image pipes processing.

4 Claims, 3 Drawing Sheets

FIG. 4

# PROGRAMMABLE ARCHITECTURE FOR FLEXIBLE CAMERA IMAGE PIPE PROCESSING

CLAIM OF PRIORITY

This application claims priority under 35 U.S.C. 119(e)(1) to U.S. Provisional Application No. 60/863,472 filed Oct. 30, 2006.

TECHNICAL FIELD OF THE INVENTION

The technical field of this invention is programmable data processors used for digital still cameras.

BACKGROUND OF THE INVENTION

Digital still cameras require a large amount of signal processing upon image capture. This processing includes data compression of the captured image to reduce the amount of memory required to store the image and reduce the amount of bandwidth required to transmit the image. This data processing of newly captured images is referred to as image pipe processing.

There are two known methods to preform image pipe processing. The first method uses special purpose hardware to perform a fixed set of functions. Such special purpose hardware is generally fast and requires relatively little semiconductor area to implement. However because the functions are fixed, there is little flexibility and no opportunity to change or augments functions following initial manufacture. The second method uses a programmable data processor to perform the image pipe functions. This method provides great flexibility. It is generally possible to change the particular operations performed even in the hands of the consumer after manufacture. This method is generally slower than using special purpose hardware and generally requires more semiconductor area to implement.

Therefore there is a need in the art to provide image pipe processing in a manner that is fast, requires little semiconductor area and flexible in implementation.

SUMMARY OF THE INVENTION

This invention is a programmable image pipe processing architecture that offers full software flexibility to implement latest and greatest algorithms at fully hardwired performance levels. This invention achieves hardwired image pipe processing performance but offers full flexibility and programmability of software achieving the best of both hardwired and software image pipes processing.

BRIEF DESCRIPTION OF THE DRAWINGS

These and other aspects of this invention are illustrated in the drawings, in which.

DETAILED DESCRIPTION OF PREFERRED EMBODIMENTS

This invention mixes programmable blocks and hardwired blocks to enhance functionality of the image pipe processing.

Many image processing blocks used in hardware logic are incorporated unmodified. These incorporated blocks include CCDC, h3A, LDC. This minimizes the gate count and power consumption by leaving as many hardwired blocks as possible. Examples include RGB2RGB blending, gamma correction, and RGB2YCbCr color conversion. These programmable blocks fit into the existing IPIPE architecture. It is possible to provide a complete IPIPE using this approach.

Pre-filter and noise filtering are ideal candidate for programmability. Other candidates include CFA interpolation and edge enhancement/chroma suppression. This invention uses scalable architecture that works with fundamental basic building blocks to derive higher performance and provides a decoupled access and execute mechanism. This invention is easier to build and has a design that is easy to verify. Depending on performance and algorithm requirements, this invention can scale the provided special purpose hardware appropriately at design/instantiation time. The programming model of this invention is not very complicated. This provides the potential for a compiler or similar tool to take an algorithm specified in C-code and build native instructions to execute the algorithm.

Figure 1:
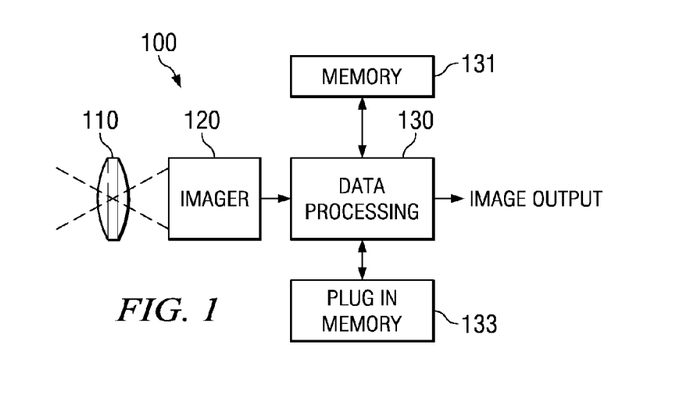
FIG. 1 illustrates the components of typical of a typical digital still camera to which this invention is applicable (prior art)

FIG. 1 illustrates a block diagram of a typical known digital still camera 100 to which this invention is applicable. Such digital still cameras may be stand alone devices or included within a wireless telephone handset. Digital still camera 100 includes optical system 110 which focuses the scene to be captured onto imager 120. Imager 120 is typically a charge coupled device (CCD) or a CMOS imager. The captured image is fed to data processor 130. Data processor operates in conjunction with internal memory 131 and plug in memory 133. Internal memory 131 typically includes a combination of read only memory (ROM) storing algorithms and constants used by data processor 130 and random access memory (RAM) used for temporary storage of data in process. Following operation upon the image data, data processor 130 typically stores the resultant images in plug in memory 133. Plug in memory 133 is typically a form of non-volatile read/write memory such as FLASH memory. Plug in memory 133 can be removed and replaced with a similar plug in memory to provide additional storage for more images. Image data can also be output from data processor 130 to another system such as directly to a printer for immediate printing or to a computer for further storage.

Figure 2:
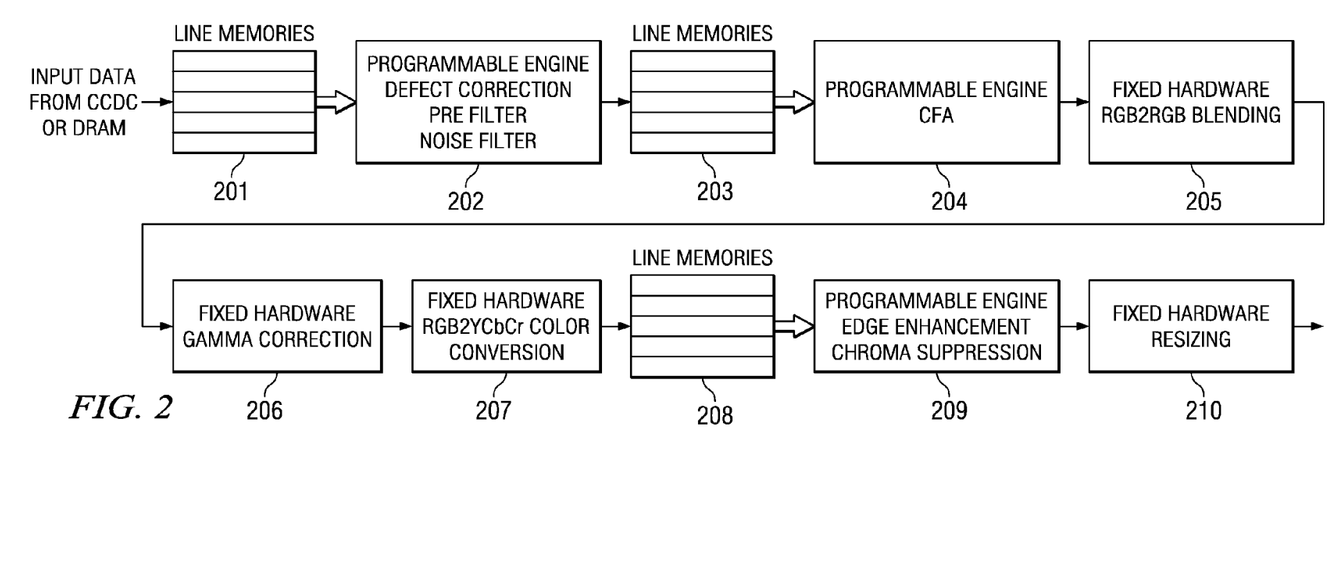
FIG. 2 illustrates a data flow view of the image pipe data processing of this invention.

FIG. 2 illustrates the data flow 200 of the processes of data processor 130 according to this invention. This invention employs a mixture of programmable operations and fixed hardware operations in image pipe processing. Data flow 200 begins with image data stored in line memories 201. Line memories 201 preferably store a block of a predetermined number of lines and a predetermined number of picture elements (pixels). As shown in FIG. 2, this data may be sourced directly from the imager or from temporary storage in internal memory 131. Input to the programmable engines in FIG. 2 (202, 204, 209) always comes from a set of line memories or a block of internal memory 131. In the preferred embodiment, each programmable engine 202, 204 or 209 operates on a maximum of 5 by 5 block in a cycle. This size is scalable to 7 by 7 for on-the-fly at a higher cost in semiconductor area. Input from the line memories can handle N by N matrices of pixels. The output of each programmable engine is one pixel per clock cycle.

The first data processing in data flow 200 occurs in programmable engine 202. Programmable engine 202 performs one or more of the following filter functions: defect correction; pre-filtering; and noise filtering. It is known in the art that individual pixels of imager 120 may become stuck generating a saturated value rather than a value dependent upon received light intensity. It is also known in the art to detect such stuck pixels and attempt to correct the defective data. Generally data processor 130 maintains a list of such stuck pixels. Upon encountering a block including a stuck pixel, programmable engine 202 forms substitute data from the values of one or more of the adjacent pixels. This is a filtering function well suited to programmable hardware. Pre-filtering includes compensation for the known light response of imager 120. This typically would involve applying some compensating function to the original image data. Noise filtering generally involves two dimensional spatial pass filtering to reduce high frequency noise in the response of imager 120. The output of programmable engine 202 supplies line memories 203.

Line memories 203 temporarily stores data used by programmable engine 204. Programmable engine 204 performs a color filter array (CFA) function. It is known in the art that individual pixels of imager 120 include respective red, green and blue filters to respond to only that segment of the received light. It is typical for each 2 by 2 block of pixels to include one red filtered pixel, one blue filtered pixel and two green filtered pixels. The CFA function converts this form of data into red, green, blue (RGB) data for each pixel.

The output of programmable engine 204 directly feeds the input of one of the fixed data processing hardware blocks. Fixed hardware block 205 performs blending from a red/green/blue (RGB) format to a corresponding alternate RGB format.

The output of fixed hardware block 205 directly feeds the input of hardware block 206. Hardware block 206 performs gamma correction. Gamma correction is preferably performed separately for each color component. Gamma correction correct for non-linearity in the response of imager 120.

The output of fixed hardware block 206 directly feeds the input of fixed hardware block 207. Fixed hardware block 207 performs color space conversion from red/green/blue (RGB) to luminance/blue chrominance/red chrominance (YCbCr) color space. The output of fixed hardware block 207 is temporarily stored in line memories 208.

Line memories 208 feed the input of programmable engine 209. Programmable engine 209 preferably performs two functions: edge enhancement; and chroma suppression. Edge enhancement involves filtering each pixel based upon surrounding pixels to sharpen edges in the image. Edges in input images are detected using a 2 dimensional high-pass filter. Edge sharpness is increased using the value from a non-linear table. Chroma suppression controls the gain of blue chrominance component Cb and the red chrominance component Cr in dark, overly bright or desaturated areas to reduce noise and remove color artifacts.

The output of programmable engine 209 drives the input of fixed hardware block 210. Fixed hardware block 210 performs image resizing. This involves decimation of the input image to achieve a smaller image or interpolation from the input image to achieve a larger image.

Figure 3:
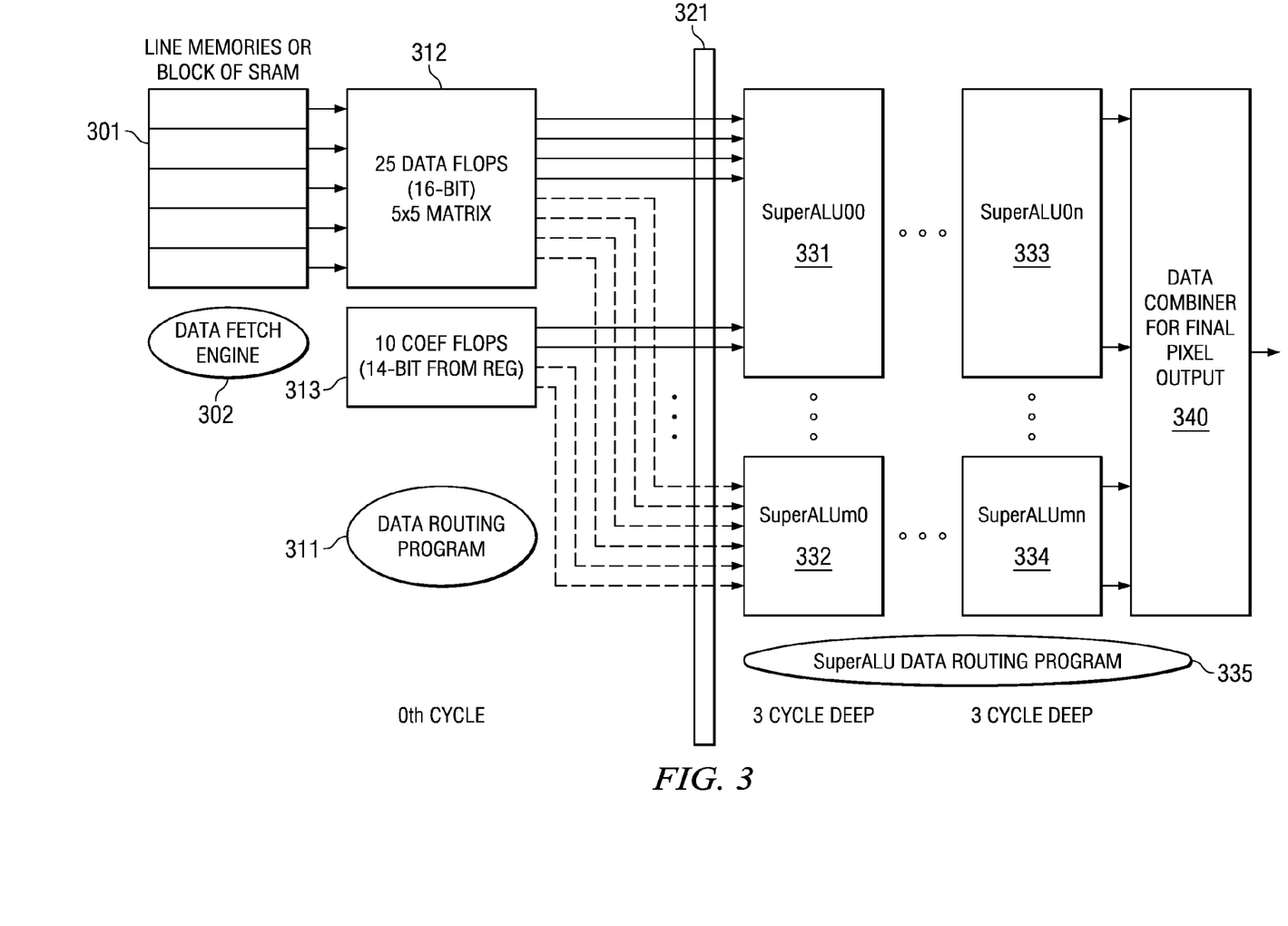
FIG. 3 illustrates a block diagram of the programmable engine of this invention.

FIG. 3 illustrates an example programmable engine such as illustrated at 202, 204 and 209 in FIG. 2. Line memories 301 represent the line memories required to drive any programmable engine. FIG. 3 also includes data fetch engine 302. Data fetch engine 302 is any data movement controller such as a direct memory access (DMA) unit that can deliver the desired data to the programmable engine. Data routing program 311 controls data flops 312 and constant flops 313 routing data to the superALUs 331 to 334 via crossbar 321. Data flops 312 controls the routing of a 5 by 5 matrix of 16-bit data values. Constant flops 313 controls the routing of ten 14-bit coefficients. For on-the-fly operation, a column of 5 pixels are forwarded per cycle with data fetching in raster scan order. For input from a synchronous dynamic random access memory (SDRAM) for line based processing, a column of 5 pixels are forwarded per cycle with data fetching in raster scan order. For input from SDRAM for block based processing, 5 pixels are forwarded per cycle with data fetching in a programmed order. Data routing program 311 is responsible for routing 4 inputs from the data flops 312 and 2 inputs from the coefficient flops 313 per SuperALU.

The programmable engine includes a matrix of superALUs 331 to 333. Each superALU receives data from data router 312 and/or from another superALU and coefficients from coefficient router 313. Each superALU supplies results to data combiner 340 and/or another superALU. Multiple superALUs can operate in parallel in both X and Y dimensions. The number of SuperALUs is scalable and selected at design/instantiation time. Communication between SuperALUs is permitted by data passing and is controlled by the SuperALU data routing program 335. Data combiner 340 combine the SuperALU outputs into the final pixel data.

Figure 4:
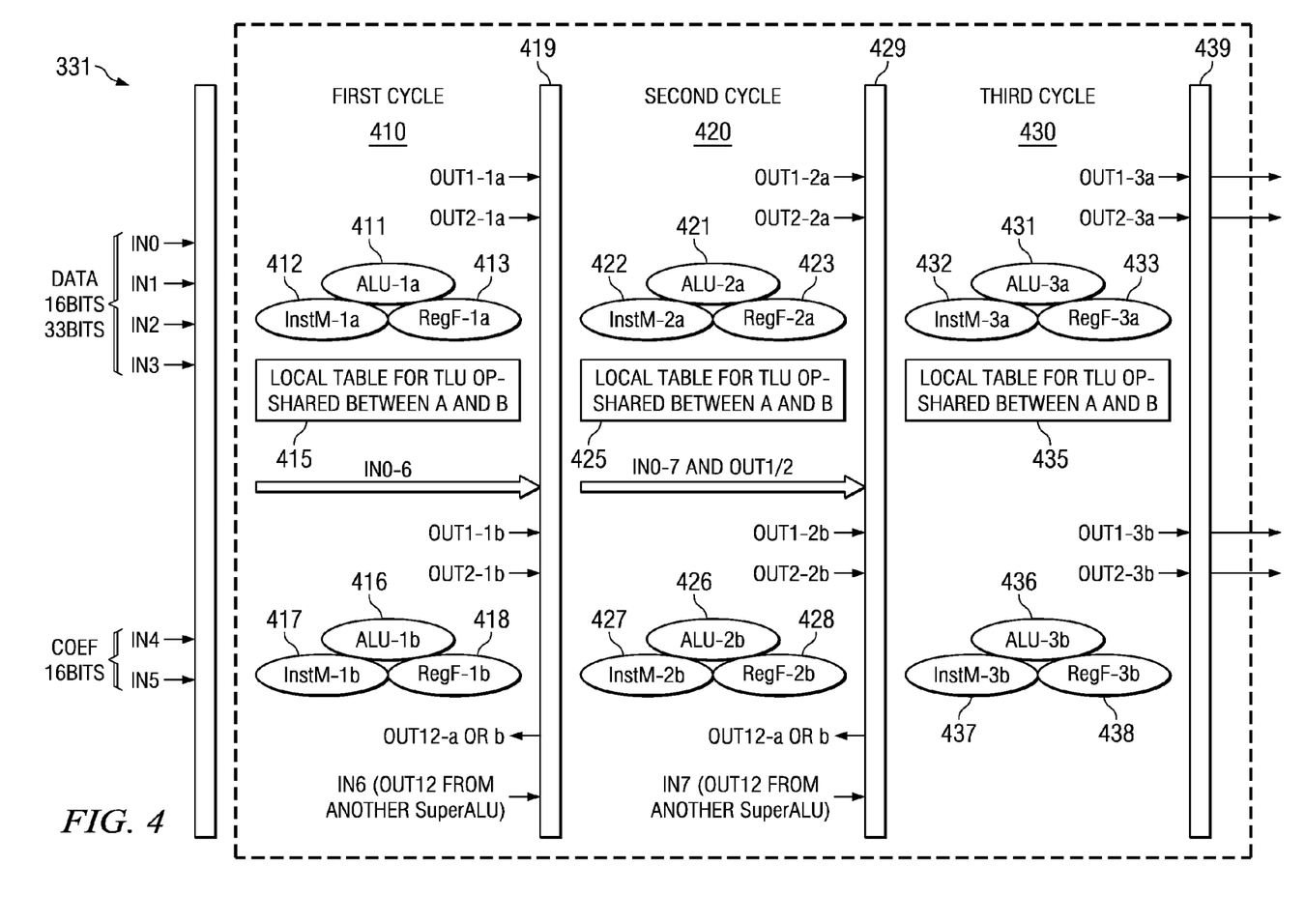
FIG. 4 illustrates a block diagram super arithmetic logic unit (SuperALU) of this invention.

FIG. 4 illustrates an example superALU 331. SuperALU 331 includes a 3 stage pipeline. Each pipeline stage preferably includes an A and a B arithmetic logic unit. First stage 410 includes first ALU 411 with corresponding instruction memory 412 and register file 413, local look up table 415, second ALU 416 with corresponding instruction memory 417 and register file 418. First stage 410 supplies data for routing to data router 419. Second stage 420 includes first ALU 421, instruction memory 422, register file 423, local look up table memory 425, second ALU 426, instruction memory 427, register file 428 and data router 429. Third stage 430 includes first ALU 431, instruction memory 432, register file 433, local look up table 435, second ALU 436, instruction memory 437, register file 438 and data router 439. This arrangement is scalable up or down as required at design/instantiation time.

Multiple SuperALUs can operate in parallel. One SuperALU can communicate with a first other SuperALU during the second stage and a second other SuperALU during the third stage. FIG. 4 illustrates the corresponding inputs and outputs to data routers 419 and 429. The control program for this communication routing resides outside the SuperALU program in data routing program 335. The size of the instruction memory per ALU, which dictates number of instructions that can be stored locally, is scalable at design/instantiation time.

In the preferred embodiment instruction fetch, decode, and execution all happen in the same cycle. The clock frequency in the preferred embodiment is 100 to 120 MHz. A single stage pipeline is believed feasible at these frequencies. It is feasible to divide the instruction pipeline micro-architecture into 2 stages if required.

The size of the local register file per ALU is scalable at design/instantiation time. The preferred embodiment includes 32 registers, each storing 33-bit data words.

Each ALU received up to 4 inputs with source being either from the register file or data from IN*/OUT*. These are accessed via 6-bit identifiers as shown in Table 1.

TABLE 1

| Bit Values | Identity |
| --- | --- |
| 000000 | IN0 |
| 000001 | IN1 |
| 000010 to 000111 | IN2 to IN7 |
| 001000 to 001011 | OUT1a to OUT2b |
| 001100 to 011011 | Undefined |
| 011100 | 33-bit hex000000000, read only |
| 011101 | 33-bit hex0FFFFFFFF, read only |
| 011110 | 33-bit hex100000000, read only |
| 011111 | 33-bit hex1FFFFFFFF, read only |
| 100000 to 111111 | Corresponding Data Register |

There are 3 look-up tables, one in each pipeline for table lookup instructions. These are shared between the two ALUs. Both ALU1a and ALU1b cannot perform a table lookup in the same cycle. This is because there is only one table to index. There is no hardware protection for look-up table access. Accordingly software must handle schedule dependencies explicitly.

The preferred embodiment includes two parallel ALUs per pipeline stage. The can be scaled up or down at design/instantiation time.

Table 2 shows the outlines of an typical instruction for the ALUs illustrated in FIG. 4.

TABLE 2

| Nemonic | Name | Bits |
| --- | --- | --- |
| OP | Operation | 7 |
| CF_SRC | Conditional Flag Source | 7 |
| SRC1 | Source Operand 1 | 6 |
| SRC1_LS | Source Operand 1 Left Shift | 3 |
| SRC2 | Source Operand 2 | 6 |
| SRC2_LS | Source Operand 2 Left Shift | 3 |
| SRC3 | Source Operand 3 | 6 |
| SRC3_LS | Source Operand 3 Left Shift | 3 |
| SRC4 | Source Operand 4 | 6 |
| SRC4_LS | Source Operand 4 Left Shift | 3 |
| RSH | Right Shift Bits | 8 |
| CL_YN | Clip Output Yes or No | 1 |
| S_U | Signed or Unsigned Output | 1 |
| CL_LEN | Clip bit length | 5 |
| ABS | Absolute Value | 1 |
| DST_REG | Destination Register | 5 |
| STALL | Stall | 1 |
| FORW | Forward Output | 1 |

The OP bits designate the operation performed. A list of instructions appears below.

The CF_SRC bits designate the source of the condition flag. All instructions are conditional on a selected 1-bit source. These 7 bits select OUT2 from the previous arithmetic logic unit or the most significant bit of one of the 31 data registers. If this bit is "1", then the instruction writes its results. If this bit is "0", then the instruction does not write its results.

There is a source operand designation and a corresponding source operand left shift amount for each of four source operands. The 6 bits of the source operand selects one input to the arithmetic logic unit or one of the 31 data registers as the corresponding source operand. The 3 bits of the source operand shift amount selects a left shift from 0 to 7 bits depending upon these 3 bits. This shift occurs before any operations on the data.

The RSH bits designate an amount of right shift of the results of the operation.

The CL_YN bit indicates whether the results of the operation are clipped or not. A "1" indicates a clipped output, a "0" indicates no clipping.

The S_U bit indicates whether the results of the operation are designated a signed number or an unsigned number. A "1" indicates a signed number, a "0" indicates an unsigned number.

The CL_LEN bits indicate the number of bits to clip if the CL_YN bit indicates clipping. These 5 bits indicate a clipping length of up to 31 bits.

The ABS bit indicates whether the output is an absolute value. A "1" indicates taking the absolute value of the output, a "0" indicates the output is the natural result of the operation.

The DST_REG bits designate the destination register for the operation results. The 32-bit result and a 1-bit sign are stored in one of 31 data registers depending upon the value of this field.

The STALL bit indicates whether the next arithmetic logic unit stalls if the output is not required for the input of the next arithmetic logic unit. A "1" indicates a stall, a "0" indicates normal operation.

The FOWR bit indicates whether to forward an intermediate output to a next superALU. A "1" indicates the intermediate output is forwarded, a "0" indicates it is not.

The following is a description of instructions used in this invention. As noted above, all instructions are conditional and thus dependent upon the digital state of the most significant bit of the condition value source. In addition, the results of many instructions are modified depending on the state of the ABS, S_Um CL_LEN and CL_YN bits.

OP=MULT:

IF NOT ( MSB (CF_SRC) )
    OUT1 = [ { [16 LSB (SRC1 << SRC1.LSH)] * [16 LSB (SRC2 << SRC2.LSH)] } >> RSH ]
{Absolute above result followed by Clip result based on ABS, S_U, CL_LEN, and CL_YN}
    OUT2 = zero flag (1 if OUT1 == 0 otherwise 0)
    DST_REG = OUT2.OUT1 (33-bits total)

The MULT instruction forms the product of the 16 least significant bits of the first source operand as left shifted by the corresponding shift amount with the 16 least significant bits of the second source operand as left shifted, the result right shifted by the right shift amount. Output 1 is the calculation result. Output 2 is the zero flag result, which is "1" if Output 1 is equal to zero, and "0" otherwise. The data stored in the destination register is a 33-bit concatenation of Output 2 and Output 1.

OP=ADD:

IF NOT ( MSB (CF_SRC) )
    OUT1 = [ { [16 LSB (SRC1 << SRC1.LSH)] + [16 LSB (SRC2 << SRC2.LSH)] + [16 LSB (SRC3 << SRC3.LSH)] + [16 LSB (SRC4 << SRC4.LSH)] } >> RSH ]

{Absolute above result followed by Clip result based on ABS,
    S_U, CL_LEN, and CL_YN}
    OUT2 = zero flag (1 if OUT1 == 0 otherwise 0)
    DST_REG = OUT2.OUT1 (33-bits total)

The ADD instruction forms the sum of the 16 least significant bits of the first source operand as left shifted by the corresponding shift amount, the 16 least significant bits of the second source operand as left shifted, the 16 least significant bits of the third source operand as left shifted and the 16 least significant bits of the fourth source operand as left shifted, the result right shifted by the right shift amount. Output 1 is the calculation result. Output 2 is the zero flag result, which is "1" if Output 1 is equal to zero, and "0" otherwise. The data stored in the destination register is a 33-bit concatenation of Output 2 and Output 1.

OP=SUB:

IF NOT ( MSB (CF_SRC) )
    OUT1 = [ { [16 LSB (SRC1 << SRC1.LSH)] – [16 LSB (SRC2 << SRC2.LSH)] } >> RSH ]
{Absolute above result followed by Clip result based on ABS,
    S_U, CL_LEN, and CL_YN}
    OUT2 = zero flag (1 if OUT1 == 0 otherwise 0)
    DST_REG = OUT2.OUT1 (33-bits total)

The SUB instruction forms the difference of the 16 least significant bits of the second source operand as left shifted by the corresponding shift amount subtracted from the 16 least significant bits of the first source operand as left shifted, the result right shifted by the right shift amount. Output 1 is the calculation result. Output 2 is the zero flag result, which is "1" if Output 1 is equal to zero, and "0" otherwise. The data stored in the destination register is a 33-bit concatenation of Output 2 and Output 1.

OP=ADDSUB1:

IF NOT ( MSB (CF_SRC) )
    OUT1 = [ { [16 LSB (SRC1 << SRC1.LSH)] + [16 LSB (SRC2 << SRC2.LSH)] + [16 LSB (SRC3 << SRC3.LSH)] – [16 LSB (SRC4 << SRC4.LSH)] } >> RSH ]
{Absolute above result followed by Clip result based on ABS,
    S_U, CL_LEN, and CL_YN}
    OUT2 = zero flag (1 if OUT1 == 0 otherwise 0)
    DST_REG = OUT2.OUT1 (33-bits total)

OP=ADDSUB2:

IF NOT ( MSB (CF_SRC) )
    OUT1 = [ { [16 LSB (SRC1 << SRC1.LSH)] + [16 LSB (SRC2 << SRC2.LSH)] – [16 LSB (SRC3 << SRC3.LSH)] – [16 LSB (SRC4 << SRC4.LSH)] } >> RSH ]
{Absolute above result followed by Clip result based on ABS,
    S_U, CL_LEN, and CL_YN}
    OUT2 = zero flag (1 if OUT1 == 0 otherwise 0)
    DST_REG = OUT2.OUT1 (33-bits total)

OP=ADDSUB3:

IF NOT ( MSB (CF_SRC) )
    OUT1 = [ { [16 LSB (SRC1 << SRC1.LSH)] – [16 LSB (SRC2 << SRC2.LSH)] – [16 LSB (SRC3 << SRC3.LSH)] – [16 LSB (SRC4 << SRC4.LSH)] } >> RSH ]
{Absolute above result followed by Clip result based on ABS,
    S_U, CL_LEN, and CL_YN}
    OUT2 = zero flag (1 if OUT1 == 0 otherwise 0)
    DST_REG = OUT2.OUT1 (33-bits total)

There are three combined addition and subtraction instructions ADDSUB1, ADDSUB2 and ADDSUB3. In ADDSUB1 the 16 least significant bits of the fourth source operand as left shifted by the corresponding shift amount is subtracted from the sum of the 16 least significant bits of the first source operand as left shifted, the 16 least significant bits of the second source operand as left shifted and the 16 least significant bits of the first source operand as left shifted, the result right shifted by the right shift amount. In ADDSUB3 the 16 least significant bits of the second source operand as left shifted by the corresponding shift amount, the 16 least significant bits of the third source operand as left and the 16 least significant bits of the second source operand as left shifted are subtracted from the 16 least significant bits of the first source operand as left shifted, the result right shifted by the right shift amount. Output 1 is the calculation result. Output 2 is the zero flag result, which is "1" if Output 1 is equal to zero, and "0" otherwise. The data stored in the destination register is a 33-bit concatenation of Output 2 and Output 1.

OP=ADD32:

IF NOT ( MSB (CF_SRC) )
    OUT1 = [ { [32 LSB (SRC1 << SRC1.LSH)] + [16 LSB (SRC2 << SRC2.LSH)] } >> RSH ]
{Absolute above result followed by Clip result based on ABS,
    S_U, CL_LEN, and CL_YN}
    OUT2 = zero flag (1 if OUT1 == 0 otherwise 0)
    DST_REG = OUT2.OUT1 (33-bits total)

The ADD32 instruction forms the sum of the 32 least significant bits of the first source operand as left shifted by the corresponding shift amount and the 16 least significant bits of the second source operand as left shifted, the result right shifted by the right shift amount. Output 1 is the calculation result. Output 2 is the zero flag result, which is "1" if Output 1 is equal to zero, and "0" otherwise. The data stored in the destination register is a 33-bit concatenation of Output 2 and Output 1.

OP=LT1:

IF NOT ( MSB (CF_SRC) )
    OUT1 = OUT2
    OUT2 = Less than result (1 or 0)
        [16 LSB (SRC1 << SRC1.LSH)] < [16 LSB (SRC2 << SRC2.LSH)] ; use S_U
    DST_REG = OUT2.OUT1 (33-bits total)

OP=LT2:

```
IF NOT ( MSB (CF_SRC) )
    OUT1 = OUT2
    OUT2 = Less than result (1 or 0)
        [16 LSB (SRC1 << SRC1.LSH)] < [16 LSB (SRC2 <<
        SRC2.LSH)] OR [16 LSB (SRC3 << SRC3.LSH)] < [16
        LSB (SRC4 << SRC4.LSH)] ; use S_U
    DST_REG = OUT2.OUT1 (33-bits total)
```

OP=LT3:

```
IF NOT ( MSB (CF_SRC) )
    OUT1 = OUT2
    OUT2 = Less than result (1 or 0)
        [16 LSB (SRC1 << SRC1.LSH)] < [16 LSB (SRC2 <<
        SRC2.LSH)] AND [16 LSB (SRC3 << SRC3.LSH)] < [16
        LSB (SRC4 << SRC4.LSH)] ; use S_U
    DST_REG = OUT2.OUT1 (33-bits total)
```

There are three less than instructions LT1, LT2 and LT3. In LT1 the result indicates whether the 16 least significant bits of the first source operand as left shifted by the corresponding shift amount is less than the 16 least significant bits of the second source operand as left shifted. In LT2 the result indicates whether the 16 least significant bits of the first source operand as left shifted by the corresponding shift amount is less than the 16 least significant bits of the second source operand as left shifted OR the 16 least significant bits of the third source operand as left shifted by the corresponding shift amount is less than the 16 least significant bits of the fourth source operand as left shifted. In LT3 the result indicates whether the 16 least significant bits of the first source operand as left shifted by the corresponding shift amount is less than the 16 least significant bits of the second source operand as left shifted AND the 16 least significant bits of the third source operand as left shifted by the corresponding shift amount is less than the 16 least significant bits of the fourth source operand as left shifted. Output 1 is the comparison result the same as Output 2. Output 2 is the zero flag result, which is "1" if Output 1 is equal to zero, and "0" otherwise. The data stored in the destination register is a 33-bit concatenation of Output 2 and Output 1.

OP=GT1:

```
IF NOT ( MSB (CF_SRC) )
    OUT1 = OUT2
    OUT2 = Greater than result (1 or 0)
        [16 LSB (SRC1 << SRC1.LSH)] > [16 LSB (SRC2 <<
        SRC2.LSH)] ; use S_U
    DST_REG = OUT2.OUT1 (33-bits total)
```

OP=GT2:

```
IF NOT ( MSB (CF_SRC) )
    OUT1 = OUT2
    OUT2 = Greater than result (1 or 0)
        [16 LSB (SRC1 << SRC1.LSH)] > [16 LSB (SRC2 <<
        SRC2.LSH)] OR [16 LSB (SRC3 << SRC3.LSH)] > [16
        LSB (SRC4 << SRC4.LSH)] ; use S_U
    DST_REG = OUT2.OUT1 (33-bits total)
```

OP=GT3:

```
IF NOT ( MSB (CF_SRC) )
    OUT1 = OUT2
    OUT2 = Greater than result (1 or 0)
        [16 LSB (SRC1 << SRC1.LSH)] > [16 LSB (SRC2 <<
        SRC2.LSH)] AND [16 LSB (SRC3 << SRC3.LSH)] > [16
        LSB (SRC4 << SRC4.LSH)] ; use S_U
    DST_REG = OUT2.OUT1 (33-bits total)
```

There are three greater than instructions GT1, GT2 and GT3. In GT1 the result indicates whether the 16 least significant bits of the first source operand as left shifted by the corresponding shift amount is greater than the 16 least significant bits of the second source operand as left shifted. In GT2 the result indicates whether the 16 least significant bits of the first source operand as left shifted by the corresponding shift amount is greater than the 16 least significant bits of the second source operand as left shifted OR the 16 least significant bits of the third source operand as left shifted by the corresponding shift amount is greater than the 16 least significant bits of the fourth source operand as left shifted. In GT3 the result indicates whether the 16 least significant bits of the first source operand as left shifted by the corresponding shift amount is greater than the 16 least significant bits of the second source operand as left shifted AND the 16 least significant bits of the third source operand as left shifted by the corresponding shift amount is greater than the 16 least significant bits of the fourth source operand as left shifted. Output 1 is the comparison result the same as Output 2. Output 2 is the zero flag result, which is "1" if Output 1 is equal to zero, and "0" otherwise. The data stored in the destination register is a 33-bit concatenation of Output 2 and Output 1.

OP=EQ1:

```
IF NOT ( MSB (CF_SRC) )
    OUT1 = OUT2
    OUT2 = Equal to result (1 or 0)
        [16 LSB (SRC1 << SRC1.LSH)] == [16 LSB (SRC2 <<
        SRC2.LSH)] ; use S_U
    DST_REG = OUT2.OUT1 (33-bits total)
```

OP=EQ2:

```
IF NOT ( MSB (CF_SRC) )
    OUT1 = OUT2
    OUT2 = Equal to result (1 or 0)
        [16 LSB (SRC1 << SRC1.LSH)] == [16 LSB (SRC2 <<
        SRC2.LSH)] OR [16 LSB (SRC3 << SRC3.LSH)] == [16
        LSB (SRC4 << SRC4.LSH)] ; use S_U
    DST_REG = OUT2.OUT1 (33-bits total)
```

OP=EQ3:

```
IF NOT ( MSB (CF_SRC) )
    OUT1 = OUT2
    OUT2 = Equal to result (1 or 0)
        [16 LSB (SRC1 << SRC1.LSH)] == [16 LSB (SRC2 <<
        SRC2.LSH)] AND [16 LSB (SRC3 << SRC3.LSH)] == [16
        LSB (SRC4 << SRC4.LSH)] ; use S_U
    DST_REG = OUT2.OUT1 (33-bits total)
```

There are three equal to instructions EQ1, EQ2 and EG3. In EG1 the result indicates whether the 16 least significant bits of the first source operand as left shifted by the corresponding shift amount is equal to the 16 least significant bits of the second source operand as left shifted. In EQ2 the result indicates whether the 16 least significant bits of the first source operand as left shifted by the corresponding shift amount is equal to the 16 least significant bits of the second source operand as left shifted OR the 16 least significant bits of the third source operand as left shifted by the corresponding shift amount is equal to the 16 least significant bits of the fourth source operand as left shifted. In EQ3 the result indicates whether the 16 least significant bits of the first source operand as left shifted by the corresponding shift amount is equal to the 16 least significant bits of the second source operand as left shifted AND the 16 least significant bits of the third source operand as left shifted by the corresponding shift amount is equal to the 16 least significant bits of the fourth source operand as left shifted. Output 1 is the comparison result the same as Output 2. Output 2 is the zero flag result, which is "1" if Output 1 is equal to zero, and "0" otherwise. The data stored in the destination register is a 33-bit concatenation of Output 2 and Output 1.

OP=LTE1:

```
IF NOT ( MSB (CF_SRC) )
    OUT1 = OUT2
    OUT2 = Less than or equal to result (1 or 0)
        [16 LSB (SRC1 << SRC1.LSH)] <= [16 LSB (SRC2 <<
        SRC2.LSH)] ; use S_U
    DST_REG = OUT2.OUT1 (33-bits total)
```

OP=LTE2:

```
IF NOT ( MSB (CF_SRC) )
    OUT1 = OUT2
    OUT2 = Less than or equal to result (1 or 0)
        [16 LSB (SRC1 << SRC1.LSH)] <= [16 LSB (SRC2 <<
        SRC2.LSH)] OR [16 LSB (SRC3 << SRC3.LSH)] <= [16
        LSB (SRC4 << SRC4.LSH)] ; use S_U
    DST_REG = OUT2.OUT1 (33-bits total)
```

OP=LTE3:

```
IF NOT ( MSB (CF_SRC) )
    OUT1 = OUT2
    OUT2 = Less than or equal to result (1 or 0)
        [16 LSB (SRC1 << SRC1.LSH)] <= [16 LSB (SRC2 <<
        SRC2.LSH)] AND [16 LSB (SRC3 << SRC3.LSH)] <= [16
        LSB (SRC4 << SRC4.LSH)] ; use S_U
    DST_REG = OUT2.OUT1 (33-bits total)
```

There are three less than or equal to instructions LTE1, LTE2 and LTE3. In LTE1 the result indicates whether the 16 least significant bits of the first source operand as left shifted by the corresponding shift amount is less than of equal to the 16 least significant bits of the second source operand as left shifted. In LTE2 the result indicates whether the 16 least significant bits of the first source operand as left shifted by the corresponding shift amount is less than or equal to the 16 least significant bits of the second source operand as left shifted OR the 16 least significant bits of the third source operand as left shifted by the corresponding shift amount is less than of equal to the 16 least significant bits of the fourth source operand as left shifted. In LTE3 the result indicates whether the 16 least significant bits of the first source operand as left shifted by the corresponding shift amount is less than or equal to the 16 least significant bits of the second source operand as left shifted AND the 16 least significant bits of the third source operand as left shifted by the corresponding shift amount is less than or equal to the 16 least significant bits of the fourth source operand as left shifted. Output 1 is the comparison result the same as Output 2. Output 2 is the zero flag result, which is "1" if Output 1 is equal to zero, and "0" otherwise. The data stored in the destination register is a 33-bit concatenation of Output 2 and Output 1.

OP=GTE1:

```
IF NOT ( MSB (CF_SRC) )
    OUT1 = OUT2
    OUT2 = Greater than or equal to result (1 or 0)
        [16 LSB (SRC1 << SRC1.LSH)] >= [16 LSB (SRC2 <<
        SRC2.LSH)] ; use S_U
    DST_REG = OUT2.OUT1 (33-bits total)
```

OP=GTE2:

```
IF NOT ( MSB (CF_SRC) )
    OUT1 = OUT2
    OUT2 = Greater than or equal to result (1 or 0)
        [16 LSB (SRC1 << SRC1.LSH)] >= [16 LSB (SRC2 <<
        SRC2.LSH)] OR [16 LSB (SRC3 << SRC3.LSH)] >= [16
        LSB (SRC4 << SRC4.LSH)] ; use S_U
    DST_REG = OUT2.OUT1 (33-bits total)
```

OP=GTE3:

```
IF NOT ( MSB (CF_SRC) )
    OUT1 = OUT2
    OUT2 = Greater than or equal to result (1 or 0)
        [16 LSB (SRC1 << SRC1.LSH)] >= [16 LSB (SRC2 <<
        SRC2.LSH)] AND [16 LSB (SRC3 << SRC3.LSH)] >= [16
        LSB (SRC4 << SRC4.LSH)] ; use S_U
    DST_REG = OUT2.OUT1 (33-bits total)
```

There are three greater than or equal to instructions GTE1, GTE2 and GTE3. In GTE1 the result indicates whether the 16 least significant bits of the first source operand as left shifted by the corresponding shift amount is greater than or equal to the 16 least significant bits of the second source operand as left shifted. In GTE2 the result indicates whether the 16 least significant bits of the first source operand as left shifted by the corresponding shift amount is greater than or equal to the 16 least significant bits of the second source operand as left shifted OR the 16 least significant bits of the third source operand as left shifted by the corresponding shift amount is greater than or equal to the 16 least significant bits of the fourth source operand as left shifted. In GTE3 the result indicates whether the 16 least significant bits of the first source operand as left shifted by the corresponding shift amount is greater than or equal to the 16 least significant bits of the second source operand as left shifted AND the 16 least significant bits of the third source operand as left shifted by the corresponding shift amount is greater than or equal to the 16 least significant bits of the fourth source operand as left shifted. Output 1 is the comparison result the same as Output 2. Output 2 is the zero flag result, which is "1" if Output 1 is equal to zero, and "0" otherwise. The data stored in the destination register is a 33-bit concatenation of Output 2 and Output 1.

OP=MEDIAN3:

```
IF NOT ( MSB (CF_SRC) )
    OUT1 = Median of [16 LSB (SRC1 << SRC1.LSH)], [16 LSB
        (SRC2 << SRC2.LSH)], [16 LSB (SRC3 << SRC3.LSH)],
        ; use S_U
    OUT2 = zero flag (1 if OUT1 == 0 otherwise 0)
    DST_REG = OUT2.OUT1 (33-bits total)
```

The MEDIAN3 instruction outputs the median of the three values the 16 least significant bits of the first source operand as left shifted by the corresponding shift amount, the 16 least significant bits of the second source operand as left shifted and the 16 least significant bits of the third source operand as left shifted. Output 1 is the determined median value. Output 2 is the zero flag result, which is "1" if Output 1 is equal to zero, and "0" otherwise. The data stored in the destination register is a 33-bit concatenation of Output 2 and Output 1.

OP=MIN4:

```
IF NOT ( MSB (CF_SRC) )
    OUT1 = Minimum of
        [16 LSB (SRC1 << SRC1.LSH)] , [16 LSB (SRC2 <<
        SRC2.LSH)] , [16 LSB (SRC3 << SRC3.LSH)] , [16 LSB
        (SRC4 << SRC4.LSH)] ; use S_U
    OUT2 = zero flag (1 if OUT1 == 0 otherwise 0)
    DST_REG = OUT2.OUT1 (33-bits total)
```

The MIN4 instruction outputs the minimum of the four values the 16 least significant bits of the first source operand as left shifted by the corresponding shift amount, the 16 least significant bits of the second source operand as left shifted, the 16 least significant bits of the third source operand as left shifted and the 16 least significant bits of the third fourth source operand as left shifted. Output 1 is the determined minimum value. Output 2 is the zero flag result, which is "1" if Output 1 is equal to zero, and "0" otherwise. The data stored in the destination register is a 33-bit concatenation of Output 2 and Output 1.

OP=MAX4:

```
IF NOT ( MSB (CF_SRC) )
    OUT1 = Maximum of
        [16 LSB (SRC1 << SRC1.LSH)] , [16 LSB (SRC2 <<
        SRC2.LSH)] , [16 LSB (SRC3 << SRC3.LSH)] , [16 LSB
        (SRC4 << SRC4.LSH)] ; use S_U
    OUT2 = zero flag (1 if OUT1 == 0 otherwise 0)
    DST_REG = OUT2.OUT1 (33-bits total)
```

The MAX4 instruction outputs the maximum of the four values the 16 least significant bits of the first source operand as left shifted by the corresponding shift amount, the 16 least significant bits of the second source operand as left shifted, the 16 least significant bits of the third source operand as left shifted and the 16 least significant bits of the third fourth source operand as left shifted. Output 1 is the determined maximum value. Output 2 is the zero flag result, which is "1" if Output 1 is equal to zero, and "0" otherwise. The data stored in the destination register is a 33-bit concatenation of Output 2 and Output 1.

OP=MULTADD32:

```
IF NOT ( MSB (CF_SRC) )
    OUT1 = [ { [16 LSB (SRC1 << SRC1.LSH)] * [16 LSB (SRC2
        << SRC2.LSH)] + [32 LSB (SRC3 << SRC3.LSH)] } >>
        RSH ]
    {Absolute above result followed by Clip result based on ABS,
        S_U, CL_LEN, and CL_YN}
    OUT2 = zero flag (1 if OUT1 == 0 otherwise 0)
    DST_REG = OUT2.OUT1 (33-bits total)
```

The MULTADD32 performs a combined multiplication and addition. The MULTADD32 adds the 32 least significant bits of the third operand as left shifted to the product of the 16 least significant bits of the first operand as left shifted and the 16 least significant bits of the second operand as left shifted, the result right shifted by the right shift amount. Output 1 is the calculated value. Output 2 is the zero flag result, which is "1" if Output 1 is equal to zero, and "0" otherwise. The data stored in the destination register is a 33-bit concatenation of Output 2 and Output 1.

OP=SELECT:

```
IF NOT ( MSB (CF_SRC) )
    OUT1 = [ { [32 LSB (SRC1 << SRC1.LSH)] OR [32 LSB (SRC2
        << SRC2.LSH)] based on [32 LSB (SRC3 << SRC3.LSH)]
        }] -> selected SRC1 if SRC3 == 0 else SRC2
    OUT2 = zero flag (1 if OUT1 == 0 otherwise 0)
    DST_REG = OUT2.OUT1 (33-bits total)
```

The SELECT instruction selects one of two 32 bit values. The SELECT instruction selects either the 32 least significant bits of the first operand as left shifted or the 32 least significant bits of the second operand as left shifted dependent upon the value of the 32 least significant bits of the third operand as left shifted. If the third operand is 0, the SELECT instruction selects the first operand, else it selects the second operand. Output 1 is the selected value. Output 2 is the zero flag result, which is "1" if Output 1 is equal to zero, and "0" otherwise. The data stored in the destination register is a 33-bit concatenation of Output 2 and Output 1.

OP=AND:

```
IF NOT ( MSB (CF_SRC) )
    OUT1 = [32 LSB (SRC1 << SRC1.LSH)] AND [32 LSB (SRC2 <<
        SRC2.LSH)] ; logical bit-wise AND
    OUT2 = zero flag (1 if OUT1 == 0 otherwise 0)
    DST_REG = OUT2.OUT1 (33-bits total)
```

OP=OR:

```
IF NOT ( MSB (CF_SRC) )
    OUT1 = [32 LSB (SRC1 << SRC1.LSH)] OR [32 LSB (SRC2 <<
        SRC2.LSH)] ; logical bit-wise OR
    OUT2 = zero flag (1 if OUT1 == 0 otherwise 0)
    DST_REG = OUT2.OUT1 (33-bits total)
```

OP=XOR:

```
IF NOT ( MSB (CF_SRC) )
    OUT1 = [32 LSB (SRC1 << SRC1.LSH)] XOR [32 LSB (SRC2 <<
        SRC2.LSH)] ; logical bit-wise XOR
    OUT2 = zero flag (1 if OUT1 == 0 otherwise 0)
    DST_REG = OUT2.OUT1 (33-bits total)
```

OP=NOT:

```
IF NOT ( MSB (CF_SRC) )
    OUT1 = NOT of [32 LSB (SRC1 << SRC1.LSH)] ; logical
        bit-wise NOT
    OUT2 = zero flag (1 if OUT1 == 0 otherwise 0)
    DST_REG = OUT2.OUT1 (33-bits total)
```

There are four logical instructions AND, OR, XOR and NOT. The AND instruction performs a bitwise logical AND of the 32 least significant bits of the first operand as left shifted and the 32 least significant bits of the second operand as left shifted. The OR instruction performs a bitwise logical OR of the 32 least significant bits of the first operand as left shifted and the 32 least significant bits of the second operand as left shifted. The XOR instruction performs a bitwise logical exclusive OR of the 32 least significant bits of the first operand as left shifted and the 32 least significant bits of the second operand as left shifted. The NOT instruction performs a bitwise logical inversion of the 32 least significant bits of the first operand as left shifted. Output 1 is the calculated logical value. Output 2 is the zero flag result, which is "1" if Output 1 is equal to zero, and "0" otherwise. The data stored in the destination register is a 33-bit concatenation of Output 2 and Output 1.

OP=MINSUB:

```
IF NOT ( MSB (CF_SRC) )
    OUT1 = Minimum of (SRC1-SRC2) and (SRC3-SRC4)
        [16 LSB (SRC1 << SRC1.LSH)] – [16 LSB (SRC2 <<
        SRC2.LSH)] , [16 LSB (SRC3 << SRC3.LSH)] – [16 LSB
        (SRC4 << SRC4.LSH)] ; use S_U
    OUT2 = zero flag (1 if OUT1 == 0 otherwise 0)
    DST_REG = OUT2.OUT1 (33-bits total)
```

OP=MAXSUB:

```
IF NOT ( MSB (CF_SRC) )
    OUT1 = Maximum of (SRC1-SRC2) and (SRC3-SRC4)
        {[16 LSB (SRC1 << SRC1.LSH)] – [16 LSB (SRC2 <<
        SRC2.LSH)]} , {[16 LSB (SRC3 << SRC3.LSH)] – [16
        LSB (SRC4 << SRC4.LSH)]} ; use S_U
```

-continued

```
    OUT2 = zero flag (1 if OUT1 == 0 otherwise 0)
    DST_REG = OUT2.OUT1 (33-bits total)
```

The MINSUB and the MAXSUB instructions select on of two differences. The first difference is the 16 least significant bits of the second operand as left shifted subtracted from the 16 least significant bits of the first operand as left shifted. The second difference is the 16 least significant bits of the fourth operand as left shifted subtracted from the 16 least significant bits of the third operand as left shifted. The MINSUB instruction selects the minimum of the first and second differences. The MAXSUB instruction selected the maximum of the first and second differences. Output 1 is the selected value. Output 2 is the zero flag result, which is "1" if Output 1 is equal to zero, and "0" otherwise. The data stored in the destination register is a 33-bit concatenation of Output 2 and Output 1.

OP=SECMAX:

```
IF NOT ( MSB (CF_SRC) )
    OUT1 = Second maximum value of
        [16 LSB (SRC1 << SRC1.LSH)] , [16 LSB (SRC2 <<
        SRC2.LSH)] , [16 LSB (SRC3 << SRC3.LSH)] , [16 LSB
        (SRC4 << SRC4.LSH)] ; use S_U
    OUT2 = zero flag (1 if OUT1 == 0 otherwise 0)
    DST_REG = OUT2.OUT1 (33-bits total)
```

The SECMAX instruction outputs the second maximum of the four values the 16 least significant bits of the first source operand as left shifted by the corresponding shift amount, the 16 least significant bits of the second source operand as left shifted, the 16 least significant bits of the third source operand as left shifted and the 16 least significant bits of the third fourth source operand as left shifted. Output 1 is the determined second maximum value. Output 2 is the zero flag result, which is "1" if Output 1 is equal to zero, and "0" otherwise. The data stored in the destination register is a 33-bit concatenation of Output 2 and Output 1.

OP=SECMIN:

```
IF NOT ( MSB (CF_SRC) )
    OUT1 = Second minimum value of
        {[16 LSB (SRC1 << SRC1.LSH)] , [16 LSB (SRC2 <<
        SRC2.LSH)]} , {[16 LSB (SRC3 << SRC3.LSH)] , [16
        LSB (SRC4 << SRC4.LSH)]} ; use S_U
    OUT2 = zero flag (1 if OUT1 == 0 otherwise 0)
    DST_REG = OUT2.OUT1 (33-bits total)
```

The SECMIN instruction outputs the second minimum of the four values the 16 least significant bits of the first source operand as left shifted by the corresponding shift amount, the 16 least significant bits of the second source operand as left shifted, the least significant bits of the third source operand as left shifted and the 16 least significant bits of the fourth source operand as left shifted. Output 1 is the determined second minimum value. Output 2 is the zero flag result, which is "1" if Output 1 is equal to zero, and "0" otherwise. The data stored in the destination register is a 33-bit concatenation of Output 2 and Output 1.

OP=LUT:

```
IF NOT ( MSB (CF_SRC) )
    OUT1 = Table lookup [16 LSB (SRC1 >> SRC1.LSH)]; note
        that left shift is used for right shift
    OUT2 = zero flag (1 if OUT1 == 0 otherwise 0)
    DST_REG = OUT2.OUT1 (33-bits total)
```

The LUT instruction performs a look up table operation. The index into the look up table is the 16 least significant bits of the first source operand a right shifted by the corresponding left shift amount. Output 1 is the value stored in the look up table at the indexed location. Output 2 is the zero flag result, which is "1" if Output 1 is equal to zero, and "0" otherwise. The data stored in the destination register is a 33-bit concatenation of Output 2 and Output 1.

OP=GOTO:

```
IF NOT ( MSB (CF_SRC) )
    GOTO program memory address SRC1 & SRC1.LSH & SRC2 &
        SRC3.LSH (concatenated)
    OUT1 = undefined
    OUT2 = undefined
    DST_REG = undefined
```

The GOTO instruction changes the next program instruction addressed. This next address is an immediate value formed by concatenation of the first source register bits, the first shift bits, the second source register bits and the third shift bits. The Output 1 and Output 2 states are undefined.

OP=END:

```
IF NOT ( MSB (CF_SRC) )
    END program
    OUT1 = undefined
    OUT2 = undefined
    DST_REG = undefined
```

The END instruction ends the program. The Output 1 and Output 2 states are undefined.

What is claimed is:

1. An image processing pipeline having a plurality of serially chained stages for image processing in a digital still camera, said serially chained stages comprising:
    at least one combination of a line memory receiving data from a prior serially chained stage and a programmable data processor receiving data from said line memory operable to perform a programmable data processing function upon input data received from said line memory thereby producing output data, said at least one programmable data processor including a matrix of super arithmetic logic units and further including
        a data routing block for receiving data from the corresponding line memory and routing data to selected super arithmetic logic units,
        a constant routing block for receiving data constants and routing said data constants to selected super arithmetic logic units, and
        a data routing block connected to said data routing block and said constant routing block and programmable to control data routing and constant routing to said super arithmetic logic units; and
    at least one fixed hardware block receiving data from a prior serially chained stage and supplying data to a subsequent serially chained stage constructed to perform a fixed data processing function upon input data and thereby producing output data.

2. The image processing pipeline of claim 1, wherein:
    said at least one programmable data processor further includes
        a super arithmetic logic unit data routing block connected to said matrix of super arithmetic logic units and programmable to control data routing among said matrix of super arithmetic logic units.

3. An image processing pipeline having a plurality of serially chained stages for image processing in a digital still camera, said serially chained stages comprising:
    at least one combination of a line memory receiving data from a prior serially changed stage and a programmable data processor receiving data from said line memory operable to perform a programmable data processing function upon input data received from said line memory thereby producing output data, said at least one programmable data processor, wherein each super arithmetic logic includes a plurality of serially connected stages, each stage including
        a plurality of arithmetic logic units, each operable to perform programmed data processing functions upon data,
        an instruction memory corresponding to each arithmetic logic unit storing program instructions for said corresponding arithmetic logic unit,
        a register file corresponding to each arithmetic logic unit storing operand data for said corresponding arithmetic logic unit, and
        a look up table memory shared among said plurality of arithmetic logic units of a stage storing data for look up table operations; and
    at least one fixed hardware block receiving data from a prior serially chained stage and supplying data to a subsequent serially chained stage constructed to perform a fixed data processing function upon input data and thereby producing output data.

4. The image processing pipeline of claim 3, wherein:
    said at least one programmable data processor further includes
        a super arithmetic logic unit data routing block connected to said matrix of super arithmetic logic units and programmable to control data routing among said matrix of super arithmetic logic units.

* * * * *